United States Patent
Lu et al.

(10) Patent No.: US 10,844,142 B2
(45) Date of Patent: Nov. 24, 2020

(54) DETERGENT COMPOSITIONS

(71) Applicant: DUPONT INDUSTRIAL BIOSCIENCES USA, LLC, Wilmington, DE (US)

(72) Inventors: Helen S M Lu, Wallingford, PA (US); Robert Dicosimo, Chadds Ford, PA (US); Rong Guan, Wilmington, DE (US); Weiming Qui, Wilmington, DE (US)

(73) Assignee: DUPONT INDUSTRIAL BIOSCIENCES USA, LLC, Wilmington, DE (US)

( * ) Notice: Subject to any disclaimer, the term of this patent is extended or adjusted under 35 U.S.C. 154(b) by 8 days.

(21) Appl. No.: 16/308,021

(22) PCT Filed: Jun. 12, 2017

(86) PCT No.: PCT/US2017/036973
§ 371 (c)(1),
(2) Date: Dec. 7, 2018

(87) PCT Pub. No.: WO2017/218389
PCT Pub. Date: Dec. 21, 2017

(65) Prior Publication Data
US 2019/0202942 A1    Jul. 4, 2019

Related U.S. Application Data

(60) Provisional application No. 62/349,169, filed on Jun. 13, 2016.

(51) Int. Cl.
C08B 37/00      (2006.01)
C11D 3/22       (2006.01)
C08L 5/00       (2006.01)
C11D 3/386      (2006.01)

(52) U.S. Cl.
CPC ............ *C08B 37/0009* (2013.01); *C08L 5/00* (2013.01); *C11D 3/225* (2013.01); *C11D 3/227* (2013.01); *C11D 3/386* (2013.01)

(58) Field of Classification Search
CPC ....... C08B 37/00; C08B 37/0009; C11D 3/22; C11D 3/225; C11D 3/227
See application file for complete search history.

(56) References Cited

U.S. PATENT DOCUMENTS

| | | |
|---|---|---|
| 6,346,616 B1 | 2/2002 | Duval |
| 9,139,718 B2 | 9/2015 | Paullin et al. |
| 9,695,253 B2 | 7/2017 | Nambiar et al. |
| 2009/0082248 A1 | 3/2009 | Jones |
| 2014/0179913 A1 | 6/2014 | Paullin et al. |
| 2015/0240278 A1* | 8/2015 | Nagy ................... C12P 7/14 435/97 |
| 2015/0259439 A1 | 9/2015 | Nambiar et al. |
| 2018/0282385 A1 | 10/2018 | Cheng et al. |

FOREIGN PATENT DOCUMENTS

| | | | |
|---|---|---|---|
| WO | 2011/131412 A1 | 10/2011 | |
| WO | WO 2011/131412 | * 10/2011 | .............. C11D 3/22 |
| WO | 2015/095358 A1 | 6/2015 | |
| WO | 2015/183714 | 12/2015 | |
| WO | 2015/183722 A1 | 12/2015 | |
| WO | 2015/183729 A1 | 12/2015 | |

OTHER PUBLICATIONS

Schmidt et al., Green Chem., 2014, vol. 16, pp. 1941-1946.
PCT International Preliminary Report on Patentability; PCT/US2017/036973.

* cited by examiner

*Primary Examiner* — Brian P Mruk

(57) ABSTRACT

The disclosure relates to compositions comprising a polysaccharide derivative. The polysaccharide derivative is a polysaccharide polymer wherein the polymer is substituted with at least one polyether group and/or polyamine group. Compositions comprising the polysaccharide derivative are useful as detergent compositions.

15 Claims, No Drawings

DETERGENT COMPOSITIONS

CROSS-REFERENCE TO RELATED APPLICATIONS

This application claims priority to and the benefit of U.S. provisional application No. 62/349169, titled "Detergent Compositions," filed Jun. 13, 2016, the disclosure of which is incorporated by reference herein in its entirety.

FIELD OF THE DISCLOSURE

The present disclosure is directed towards a composition comprising one or more polysaccharide derivative, wherein the polysaccharide derivative can comprise one or more polyether groups, one or more polyamine groups or a combination of polyether and polyamine groups.

BACKGROUND OF THE DISCLOSURE

Driven by a desire to find new structural polysaccharides using enzymatic syntheses or genetic engineering of microorganisms, researchers have discovered oligosaccharides and polysaccharides that are biodegradable and can be made economically from renewably sourced feedstocks.

Modern detergent compositions, including laundry, fabric, dishwashing or other cleaning compositions comprise common detergent ingredients such as anionic, nonionic, cationic, ampholytic, zwitterionic, and/or semi-polar surfactants; as well as enzymes such proteases, cellulases, lipases, amylases, and/or peroxidases. Laundry detergent and/or fabric care compositions may further comprise various detergent ingredients having one or more purposes in obtaining fabrics which are not only clean, fresh and sanitized but also have retained appearance and integrity. Therefore, benefit agents such as perfumes, hygiene agents, insect control agents, bleaching agents, fabric softeners, dye fixatives, soil release agents, and fabric brightening agents have been incorporated into laundry detergent and/or fabric care compositions. In using such detergent components, it is important that some of these compounds deposit on the fabrics so as to be effective during or after the laundering and/or fabric care process.

Many of the ingredients that form a part of a detergent composition are produced from non-renewable petroleum feedstocks, and there remains a need to formulate detergent compositions providing improved cleaning performance that are made from renewable resources.

SUMMARY OF THE DISCLOSURE

The present disclosure relates to a composition comprising a polysaccharide derivative wherein the polysaccharide derivative comprises a polysaccharide substituted with:
 a) one or more polyamine groups;
 b) one or more polyether groups; or
 c) a combination of a) and b);
 wherein the polysaccharide is:
 A) a polysaccharide A comprising 25 to 35% alpha-1,3-glycosidic linkages, 55 to 75% alpha-1,6-glycosidic linkages and 5 to 15% alpha-1,3,6-glycosidic linkages, having a weight average molecular weight of less than 5000 Daltons;
 B) a polysaccharide B comprising 10 to 20% alpha-1,4-glycosidic linkages, 30 to 88% by weight alpha-1,6-glycosidic linkages, and 5 to 50% alpha-1,4,6- or alpha-1,2,6-glycosidic linkages, a weight average molecular weight of less than 5000 Daltons; and/or
 C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99.5% alpha-1,6-glycosidic linkages, a weight average molecular weight of less than 300,000 Daltons.

The present disclosure also relates to a method of using the composition, wherein the method comprises contacting a substrate with the composition.

DETAILED DESCRIPTION OF THE DISCLOSURE

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

When an amount, concentration, value or parameter is given as either a range or a list of upper values and lower values, this is to be understood as specifically disclosing all ranges formed from any pair of any upper range limit and any lower range limit, regardless of whether ranges are separately disclosed. For example, when a range of "1 to 5" is recited, the recited range should be construed as including any single value within the range or as any values encompassed between the ranges, for example, "1 to 4", "1 to 3", "1 to 2", "1 to 2 & 4-5", "1 to 3 & 5". Where a range of numerical values is recited herein, unless otherwise stated, the range is intended to include the endpoints thereof, and all integers and fractions within the range.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The term "polysaccharide" means a polymer comprising glucose monomeric units linked together by alpha-glycosidic linkages. Depending upon which polysaccharide is being described, the alpha glycosidic linkages can be 1,2-1,3-, 1,4-, 1,6-, 1,2,6-, 1,3,6-, 1,4,6- or various combinations thereof. The polysaccharides are branched and have in the range of from 0.5 to 55% of alpha-glycosidic linkages that are branched, for example, 1,2,6-, 1,3,6- or 1,4,6-glycosidic linkages.

The term "polysaccharide derivative" means a polysaccharide A, B and/or C wherein at least one of the hydroxyl groups of carbon atoms 2, 3, 4 or 6 of the polysaccharide has been modified, for example, substituted with a) one or more polyamine groups, b) one or more polyether groups or c) a combination of a) and b). The carbon atoms of the polysaccharide have a numbering sequence as follows, wherein Cn represents carbon atom n, for example, C2 represents carbon atom 2:

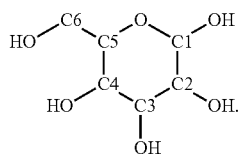

The term "alkyl", used either alone or in compound words such as "alkylthio" or "haloalkyl" includes straight chain, branched, cyclic alkyl or a combination thereof, such as, for example, methyl, ethyl, n-propyl, i-propyl, or the different butyl, pentyl or hexyl isomers. The straight-chain alkyl can have in the range of from 1 to 12 carbon atoms, while the branched and cyclic alkyl chain alkyl groups can have in the range of from 3 to 12 carbon atoms.

The term "water soluble" or "water dispersible" will refer to the polysaccharides A, B, C and/or the polysaccharide derivative thereof that is soluble at 1% by weight or higher in pH 7 water at 25° C. The percentage by weight is based on the total weight of the polysaccharide soluble in water, for example, 1 gram of polysaccharide A in 100 grams of water.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by technics such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

As used herein, "polydispersity index", "PDI", "heterogeneity index", and "dispersity" refer to a measure of the distribution of molecular mass in a given polymer (such as a glucose oligomer) sample and can be calculated by dividing the weight average molecular weight by the number average molecular weight (PDI=$M_w/M_n$).

The terms "glycosidic linkage" and "glycosidic bond" are used interchangeably herein and refer to the type of covalent bond that joins a carbohydrate (sugar) molecule to another group such as another carbohydrate. The term "alpha-X,Y-glycosidic linkage" as used herein refers to the type of covalent bond that joins alpha-D-glucose molecules to each other through carbon atoms X and Y on an alpha-D-glucose rings. For example, alpha-1,3-glycosidic linkage means that one glucose molecule is linked to an adjacent glucose molecule via the oxygen atom on carbon 1 and is linked to another adjacent glucose molecule via the oxygen atom on carbon 3. These linkages are illustrated below in the various polysaccharide structures (1), (2) and (3). Herein, "alpha-D-glucose" will be referred to as "glucose".

The terms "alpha-glucanohydrolase", "glucanohydrolase" as used herein refer to an enzyme capable of endo- or exo-hydrolyzing an alpha-glucan oligomer. A glucanohydrolase may be defined by its hydrolysis activity towards certain alpha-glycosidic linkages. Examples may include, but are not limited to, dextranases (EC 3.2.1.1; capable of endohydrolyzing alpha-1,6-linked glycosidic bonds), mutanases (EC 3.2.1.59; capable of endohydrolyzing alpha-1,3-linked glycosidic bonds), and alternanases (EC 3.2.1.-; capable of endohydrolytically cleaving alternan).

Polysaccharide A can be produced enzymatically, according to methods described in WO 2015/183729, which is herein incorporated by reference in its entirety. In some embodiments, polysaccharide A can comprise or consist essentially of 25 to 35% alpha-1,3-glycosidic linkages, 55 to 75% alpha-1,6-glycosidic linkage, 5 to 15% alpha-1,3,6-glycosidic linkages and a weight average molecular weight of less than 5000 Daltons. In some embodiments, polysaccharide A can have a polydispersity index of less than 5. In some embodiments, polysaccharide A can have a water solubility of greater than or equal to 1% by weight at 25° C. A representative example of polysaccharide A can have a structure (1) according to the following, showing examples of the alpha-1,3-alpha-1,6- and alpha-1,3,6-glycosidic linkages:

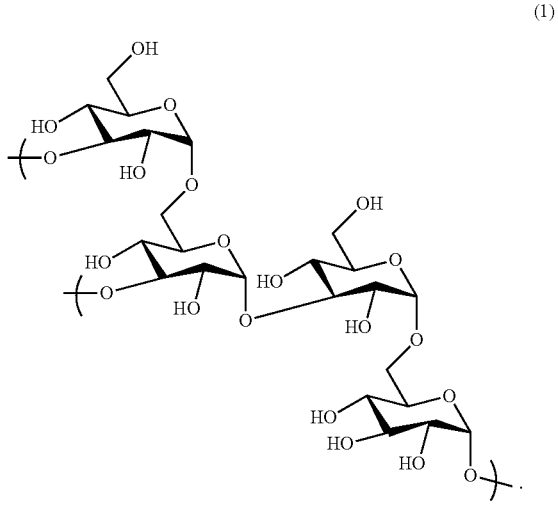

(1)

In other embodiments, polysaccharide A can comprise or consist essentially of 25 to 35% alpha-1,3-glycosidic linkages, 55 to 65% alpha-1,6-glycosidic linkages and 5 to 15% alpha-1,3,6-glycosidic linkages. In other embodiments, polysaccharide A can comprise or consist essentially of 27 to 31% alpha-1,3-glycosidic linkages, 57 to 61% alpha-1,6-glycosidic linkages and 7 to 11° A alpha-1,3,6-glycosidic linkages. In still further embodiments, polysaccharide A comprises less than 4%, or less than 2% or less than 1% or less than 0.5% of alpha-1,4-glycosidic linkages.

Polysaccharide B can be produced enzymatically according to the procedures in WO 2015/183722, which is herein incorporated by reference in its entirety. In order to introduce a sufficient amount of alpha-1,2-branching into the polysaccharide, the alpha-1,2-branching enzyme described in WO2015/0183714 or PCT/CN2015/095687 and identified, for example, as "gtfJ18T1", "EC0059T1" "gtf9905", can be added during the production of the polysaccharide. In other embodiments, any other enzyme known to produce alpha-1,2-branching can be added. In some embodiments, polysaccharide B can comprise or consist essentially of 10 to 20% alpha-1,4-glycosidic linkages, 30 to 88% alpha-1,6-linkages and 5 to 50% alpha-1,4,6- or alpha-1,2,6-glycosidic linkages, a weight average molecular weight in the range of less than 5000 Daltons and a water solubility at 25° C. of at least 1% by weight. In other embodiments, polysaccharide B comprises or consists essentially of 13 to 17% alpha-1,4-glycosidic linkages, 35 to 80% alpha-1,6-linkages and 10 to 50% alpha-1,4,6- or alpha-1,2,6-glycosidic linkages. In some embodiments, polysaccharide B can have a solubility in water at 25° C. of at least 1% by weight. A representative example of polysaccharide B can have a structure (2) according to the following, showing examples of the alpha-1,4-, alpha-1,6-, alpha-1,4,6- and alpha-1,2,6-linkages.

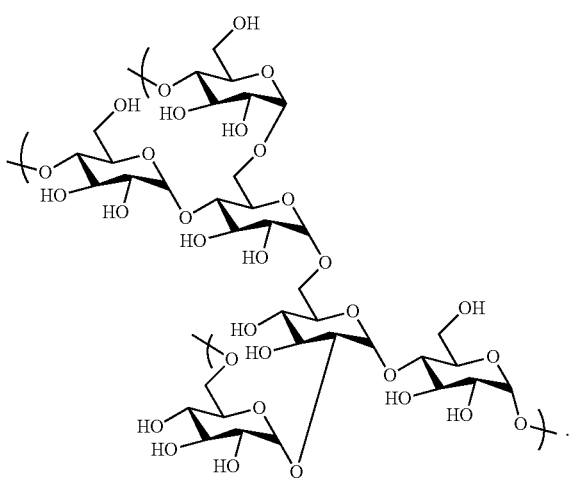
(2)

Polysaccharide C can be produced enzymatically according to the procedures in WO 2015/183714, which is herein incorporated by reference in its entirety. In some embodiments, polysaccharide C can comprise or consist essentially of 0 to 50% alpha-1,3-glycosidic linkages, 0 to 40% alpha-1,4-glycosidic linkages, 1 to 50% of a combination of alpha-1,2- and alpha-1,2,6-glycosidic linkages, 0 to 25% alpha-1,3,6-glycosidic linkages, less than 99.5% alpha-1,6-glycosidic linkages and a weight average molecular weight of less than 300,000 Daltons. In other embodiments, polysaccharide C can have 15 to 35% alpha-1,4-glycosidic linkages. In other embodiments, the sum of the alpha-1,3- and the alpha-1,3,6-glycosidic linkages can be 3 to 50%. In some embodiments, polysaccharide C can have a solubility in water at 25° C. of at least 1% by weight. A representative example of polysaccharide C can have a structure (3) according to the following, showing examples of the alpha-1,3-, alpha-1,4-, alpha-1,2-, alpha-1,2,6-, alpha-1,3,6- and alpha 1,6-glycosidic linkages:

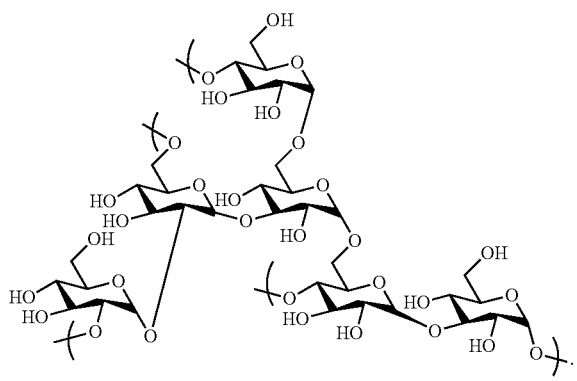
(3)

Any one or more of Polysaccharides A, B and/or C can be contacted with an alpha-glucan hydrolase during the formation of the polysaccharide or after the formation of the polysaccharide in order to lower the molecular weight of the polysaccharide. In some embodiments, the alpha-glucan hydrolase can be present during the formation of the polysaccharide, while in other embodiments, the alpha-glucan hydrolase can be added after the formation of the polysaccharide.

The term "polysaccharide derivative" means at least one of the polysaccharides A, B and/or C described above, with substituents according to Structures 4a through 4g, below, wherein at least one of the substituents is a polyamine and/or a polyether. In some embodiments, at least one polyamine group is terminated with one or more polyether groups. Structures 4a through 4g represent the various repeat units that can be present in the polysaccharides A, B, and/or C. For the purpose of clarity, each of the alpha-1,2-, alpha-1,3-, alpha-1,4-, alpha-1,6-, alpha-1,2,6-, alpha-1,3,6-, and alpha 1,4,6- repeat units is shown separately, and the stereochemistry of the alpha-linked glucose monomer units has not been shown.

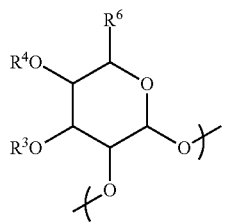

Structure 4a (alpha 1,2-)

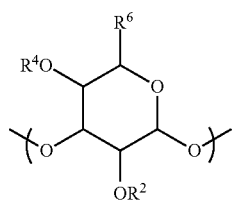

Structure 4b (alpha-1,3-)

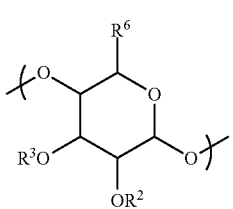

Structure 4c (alpha-1,4-)

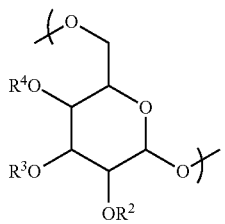

Structure 4d (alpha-1,6-)

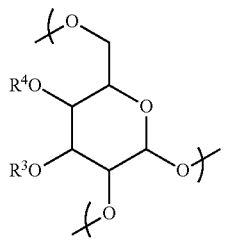

Structure 4e (alpha-1,2,6-)

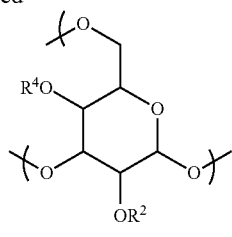

Structure 4f (alpha-1,3,6-)

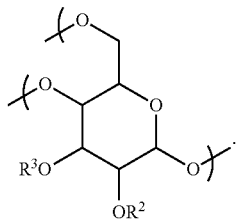

Structure 4g (alpha-1,4,6-)

Disclosed herein are compositions comprising a polysaccharide derivative wherein the polysaccharide derivative comprises polysaccharide A, B, and/or C, and wherein the polysaccharides A, B, and/or C comprise at least one corresponding repeat unit selected from those represented by Structures 4a through 4g;

wherein each $R^2$, $R^3$ and $R^4$ is independently hydrogen, $-R^7C(O)NR^8R^9$, $-R^7NR^8R^9$, $-R^7C(NOH)NR^8R^9$, $-R^7CN$, $-R^7C(O)OR^{10}$ $-C(O)OR^{10}$, $-C(O)NR^8R^9$, or $(R^7O)_xH$;

each $R^6$ is independently $-CH_2OH$, $-CH_2O-R^7-C(O)NR^8R^9$, $-CH_2OR^7NR^8R^9$, $-CH_2OR^7C(NOH)NR^8R^9$, $-CH_2OR^7CN$, $-CH_2OR^7CO_2R^{10}$, $-CH_2NR^8R^9$, $-CH_2OC(O)OR^{10}$, $-CO_2R^{13}$, $-C(O)NR^8R^9$, $-CH_2O(R^7O)_xH$, or $-CH_2OC(O)NR^8R^9$;

each $R^7$ is independently a $C_1$ to $C_{12}$ alkylene, optionally substituted with hydroxyl;

each $R^8$ or $R^9$ is independently hydrogen, $C_1$ to $C_{12}$ alkyl, $(-R^7O-)_xH$, a polyamine, or $(-R^7-NR^{11})_qR^{12}$;

each $R^{10}$ is independently hydrogen, $C_1$ to $C_{12}$ alkyl, or a cation;

each $R^{11}$ or $R^{12}$ is independently hydrogen, $R^{10}$, or $(-R^7O)_xH$;

$R^{13}$ is hydrogen, $C_1$ to $C_{12}$ alkyl, $(-R^7O-)_xH$, or a cation;

each x is independently 2 to 100;

each q is independently 0 to 12 and wherein each polysaccharide A, B or C comprises a) at least one polyamine, b) at least one polyether $(-R^7O-)_xH$, or c) a combination of a) and b); and wherein the polyamine is a linear polyamine, a branched polyamine, or a dendritic polyamine.

In one embodiment, each x is independently 2 to 100. In some embodiments, each x is independently 2 to 90, or 2 to 80, or 2 to 70, or 2 to 60, or 2 to 50, or 2 to 40, or 2 to 30, or 2 to 20. In one embodiment, each q is independently 0 to 12. In some embodiments, each q is independently 1 to 12, or 1 to 10, or 3 to 12. In some embodiments, q is 0.

Each $R^7$ group of the $(-R^7O-)_xH$ polyether group can be chosen independently of each other. This means, for example, that each $-R^7O-$ repeat unit can be the same or different. In some embodiments, each $R^7$ can be $-CH_2CH_2-$. In some embodiments, each $R^7$ can be $-CH_2CH(CH_3)-$.

In other embodiments, $R^7$ can be a combination of $-CH_2CH_2-$ and $-CH_2CH(CH_3)-$ in a random configuration or in a block configuration. In some embodiments, the polyether groups have a repeat unit according to $(-CH_2CH_2O-)$. In some embodiments, the polyether groups have a repeat unit according to $(-CH_2CH(CH_3)O-)$. In some embodiments, the polyether group has a repeat unit according to $(-CH_2CH_2O-)$, $(-CH_2CH(CH_3)O-)$, or a combination thereof. In some embodiments, the polyether contains both $(-CH_2CH_2O-)$ and $(-CH_2CH(CH_3)O-)$ groups.

Each $R^7$ group of the $(-R^7-NR^{11})_qR^{12}$ group can be chosen independently of each other. This means, for example, that each $-R^7-NR^{11}-$ repeat unit can be the same or different. In some embodiments, each $R^7$ can be $-CH_2CH_2-$. In other embodiments, $R^7$ can be a combination of $-CH_2CH_2-$ and $-CH_2CH(CH_3)-$ in a random configuration or in a block configuration. In some embodiments, the polyamine groups have a repeat unit according to $((CH_2)_yNH)$, wherein y is from 2 to 6 inclusive. Furthermore, one or more of the amine groups can be quaternized to produce quaternary amine groups, for example as disclosed in published patent application WO 2015/095358. The percentage of amine groups that are quaternized can be up to 100%.

The term "alkyl", used either alone or in compound words such as "alkylthio" or "haloalkyl" includes straight chain, branched, cyclic alkyl or a combination thereof, such as, for example, methyl, ethyl, n-propyl, i-propyl, or the different butyl, pentyl or hexyl isomers. The straight-chain alkyl can have in the range of from 1 to 12 carbon atoms, while the branched and cyclic alkyl chain alkyl groups can have in the range of from 3 to 12 carbon atoms. The term "alkylene", as used herein, refers to straight chain, branched, or cyclic radicals which are chemically bonded to other moieties through the carbon atoms at each end of the alkylene group, and includes saturated and unsaturated radicals.

The term "polyamine group" means a linear organic radical having more than one amino functional group and containing in the range of from 1 to 10, or from 1 to 12, repeat units, or a branched or dendritic organic radical having more than one amino group and containing in the range of from 3 to 12 repeat units. As used herein, "dendritic" means having a tree-like hyper-branched form. The dendritic polyamine group can have arms that are equal or unequal in length. In all embodiments of the polyamine group, the structure is terminated with $-NR^8R^9$. As examples, the polyamine groups represented by Structures 5a, 5b, 5c, and 5d are contemplated, and are shown as radicals with the attachment point to the polysaccharide indicated by an asterisk *:

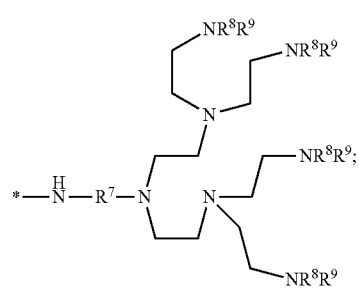

Structure 5a

Structure 5b

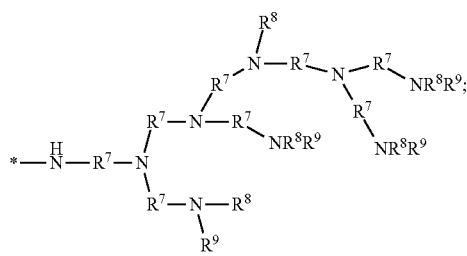

Structure 5c

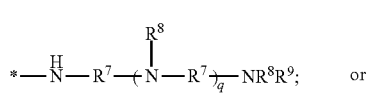    or

Structure 5d

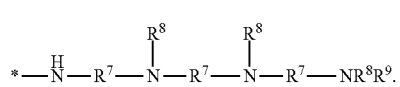

In one embodiment of the composition comprising a polysaccharide derivative, the one or more polyamine groups comprise a radical represented by Structure 5a:

Structure 5a

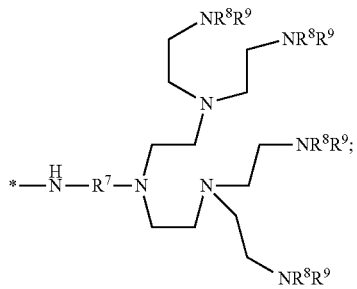

wherein each $R^7$ is independently a $C_1$ to $C_{12}$ alkylene, optionally substituted with hydroxyl;

each $R^8$ or $R^9$ is independently hydrogen, $C_1$ to $C_{12}$ alkyl, $(-R^7O-)_xH$, a polyamine, or $(-R^7-NR^{11})_qR^{12}$;

each $R^{11}$ or $R^{12}$ is independently hydrogen, $R^{10}$, or $(-R^7O)_xH$;

each $R^{19}$ is independently hydrogen, $C_1$ to $C_{12}$ alkyl, or a cation;

each x is independently 2 to 100; and q is 0 to 12. In another embodiment, q is 1 to 12. In yet another embodiment, q is 0.

In one embodiment of the composition comprising a polysaccharide derivative, the one or more polyamine groups comprise a radical represented by Structure 5b:

Structure 5b

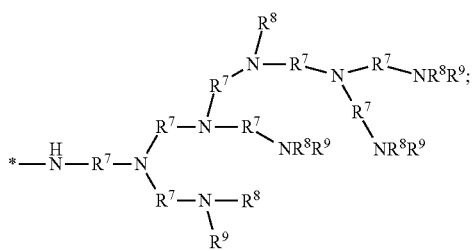

wherein each $R^7$ is independently a $C_1$ to $C_{12}$ alkylene, optionally substituted with hydroxyl;

each $R^8$ or $R^9$ is independently hydrogen, $C_1$ to $C_{12}$ alkyl, $(-R^7O-)_xH$, a polyamine, or $(-R^7-NR^{11})_qR^{12}$; and each $R^{11}$ or $R^{12}$ is independently hydrogen, $R^{10}$, or $(-R^7O)_xH$;

each $R^{10}$ is independently hydrogen, $C_1$ to $C_{12}$ alkyl, or a cation;

each x is independently 2 to 100; and q is 0 to 12. In another embodiment, q is 1 to 12. In yet another embodiment, q is 0.

In one embodiment of the composition comprising a polysaccharide derivative, the one or more polyamine groups comprise a radical represented by Structure 5c:

Structure 5c

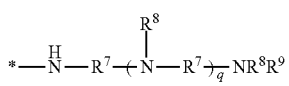

wherein each $R^7$ is independently a $C_1$ to $C_{12}$ alkylene, optionally substituted with hydroxyl;

each $R^8$ or $R^9$ is independently hydrogen, $C_1$ to $C_{12}$ alkyl, $(-R^7O-)_xH$, a polyamine, or $(-R^7-NR^{11})_qR^{12}$;

each $R^{11}$ or $R^{12}$ is independently hydrogen, $R^{10}$, or $(-R^7O)_xH$;

each $R^{10}$ is independently hydrogen, $C_1$ to $C_{12}$ alkyl, or a cation;

each x is independently 2 to 100; and q is 0 to 12. In another embodiment, q is 1 to 12. In yet another embodiment, q is 0.

In one embodiment of the composition comprising a polysaccharide derivative, the one or more polyamine groups comprise a radical represented by Structure 5d:

Structure 5d

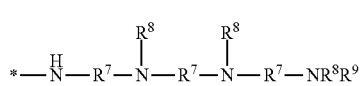

wherein each $R^7$ is independently a $C_1$ to $C_{12}$ alkylene, optionally substituted with hydroxyl;

each $R^8$ or $R^9$ is independently hydrogen, $C_1$ to $C_{12}$ alkyl, $(-R^7O-)_xH$, a polyamine, or $(-R^7-NR^{11})_qR_{12}$;

each $R^{11}$ or $R^{12}$ is independently hydrogen, $R^{10}$, or $(-R^7O)_xH$;

each $R^{10}$ is independently hydrogen, $C_1$ to $C_{12}$ alkyl, or a cation;

each x is independently 2 to 100; and q is 0 to 12. In another embodiment, q is 1 to 12. In yet another embodiment, q is 0.

The term "cation" means an ion carrying a positive charge. The cation can be an inorganic cation, for example, a cation of any one of the alkali metals Li, Na, K, Rb, Cs; a cation of any one of the alkali earth metals Be, Mg, Ca, Ba, Sr; a cation of any one of the transition metals; or an organic cation, for example, an ammonium ion, ammonium ($NH_4^+$), tetraalkyl ammonium cations, or a combination thereof. In one embodiment, the cation is a cation of Li, Na, K, Rb, Cs, or a combination thereof. In another embodiment, the cation is a cation of Be, Mg, Ca, Ba, Sr, or a combination thereof. In yet another embodiment, the cation is a cation of any one of the transition metals, or a combination thereof. In a further embodiment, the cation is an ammonium ion, ammonium, a tetraalkyl ammonium cation, or a combination thereof. In one embodiment, the cation is ammonium. In another embodiment, the cation is a tetraalkyl ammonium cation.

As used herein, the term "effective amount" will refer to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" will refer to the relative stability of the polysaccharides A, B and/or C or a derivative thereof to enzymatic hydrolysis. Having a resistance to hydrolysis is important for the use of these materials in applications wherein enzymes are present, such as in detergent, fabric care and/or laundry care applications. In some embodiments, the polysaccharides A, B and/or C or derivative thereof are resistant to cellulases. In other embodiments, the polysaccharides A, B and/or C or derivative thereof are resistant to proteases. In still further embodiments, the polysaccharides A, B and/or C or derivative thereof are resistant to amylases. In other embodiments, the polysaccharides A, B and/or C or derivative thereof are resistant to multiple classes of enzymes, for example, two or more cellulases, proteases, amylases or combinations thereof. Resistance to any particular enzyme will be defined as having at least 50, 60, 70, 80, 90, 95 or 100% of the materials remaining after treatment with the respective enzyme. The percentage remaining may be determined by measuring the supernatant after enzyme treatment using SEC-HPLC. The assay to measure enzyme resistance can be determined using the following procedure: A sample of polysaccharides A, B and/or C or derivative thereof is added to water in a vial and mixed using a PTFE magnetic stir bar to create a 1 percent by weight aqueous solution. The aqueous mixture is produced at pH 7.0 and 20° C. After the polysaccharides A, B and/or C or derivative thereof has completely dissolved, 1.0 milliliter (mL) (1 percent by weight of the enzyme formulation) of cellulase (PURADEX® EGL), amylase (PURASTAR® ST L) or protease (SAVINASE® 16.0L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered polysaccharides A, B and/or C or derivative thereof and compared to a control where no enzyme was added to the reaction mixture. Percent changes in area counts for the respective polysaccharides A, B and/or C or derivative thereof may be used to test the relative resistance of the materials to the respective enzyme treatment. Percent changes in area versus the total will be used to assess the relative amount of materials remaining after treatment with a particular enzyme. Materials having a percent recovery of at least 50%, preferably at least 60, 70, 80, 90, 95 or 100% will be considered "resistant" to the respective enzyme treatment.

The polysaccharides A, B and/or C or the derivatives thereof are synthetic, man-made compounds. Likewise, compositions comprising the polysaccharide derivatives are synthetic, man-made compounds.

The term "degree of substitution" (DoS) as used herein refers to the average number of hydroxyl groups substituted in each monomeric unit (glucose) of the polysaccharide derivative. Since there are at most three hydroxyl groups in a glucose monomeric unit in the polysaccharides A, B and/or C, the degree of substitution can be no higher than 3.

The term "molar substitution" (M.S.) as used herein refers to the moles of an organic group per monomeric unit of the polysaccharides A, B and/or C or derivative thereof. It is noted that the molar substitution value for the polysaccharide derivative may have a very high upper limit, for example in the hundreds or even thousands. For example, if the organic group is a hydroxyl-containing alkyl group, via the addition of ethylene oxide to one of the hydroxyl groups of the polysaccharide, then the so-formed hydroxyl group from the ethylene oxide can then be further etherified to form a polyether.

The phrase "aqueous composition" herein refers to a solution or mixture in which the solvent is at least about 20% by weight of water and which comprises the polysaccharide derivative. Examples of aqueous compositions herein are aqueous solutions and hydrocolloids.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the polysaccharide derivative in water or aqueous solution.

The term "aqueous solution" herein refers to a solution in which the solvent is water. The polysaccharide derivative can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that the polysaccharide derivative can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to 0.100 kg·m-1·s-1. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Suitable examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "detergent composition", "heavy duty detergent" and "all-purpose detergent" are used interchangeably herein to refer to a composition useful for regular washing of a substrate, for example, dishware, cutlery, vehicles, fabrics, carpets, apparel, white and colored textiles at any temperature.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, Calif.) for measuring the relative hand value as given by the American Association of Textile Chemists and Colorists (AATCC test method "202-2012, Relative Hand Value of Textiles: Instrumental Method").

The composition comprises a polysaccharide derivative wherein the polysaccharide derivative comprises a polysaccharide substituted with:
  a) one or more polyamine groups;
  b) one or more polyether groups; or
  c) a combination of a) and b);
  wherein the polysaccharide is:
  A) a polysaccharide A comprising 25-35% alpha-1,3-glycosidic linkages, 55-75% alpha-1,6-glycosidic linkages and 5 to 15% alpha-1,3,6-glycosidic linkages, having a weight average molecular weight of less than 5000 Daltons;
  B) a polysaccharide B comprising 10 to 20% alpha-1,4-glycosidic linkages, 30 to 88% by weight alpha-1,6-glycosidic linkages, and 5 to 50% alpha-1,4,6- or alpha-1,2,6-glycosidic linkages, a weight average molecular weight of less than 5000 Daltons; and/or
  C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99.5% alpha-1,6-glycosidic linkages, a weight average molecular weight of less than 300,000 Daltons.

In one embodiment, the polysaccharide derivative comprises a polysaccharide substituted with a) one or more polyamine groups. In another embodiment, the polysaccharide derivative comprises a polysaccharide substituted with b) one or more polyether groups. In an additional embodiment, the polysaccharide derivative comprises a polysaccharide substituted with c) a combination of a) and b), wherein the polysaccharide is substituted with one or more polyamine groups and also substituted with one or more polyether groups. In yet another embodiment, the polysaccharide derivative comprises a polysaccharide substituted with c) a combination of a) and b), wherein one or more substituents on the polysaccharide contain both at least one polyamine group and also at least one polyether group. In a further embodiment, the polysaccharide derivative comprises a polysaccharide substituted with c) a combination of a) and b), wherein at least one polyamine group is terminated with one or more polyether groups. In yet a further embodiment, the polysaccharide derivative comprises a polysaccharide substituted with c) a combination of a) and b), wherein at least one polyether group is terminated with one or more polyamine groups.

The polysaccharide derivatives disclosed herein comprise a polysaccharide which has polyether groups and/or polyamine groups randomly substituted along the polysaccharide backbone, such that the polysaccharide backbone comprises unsubstituted and substituted alpha-D-glucose rings in cases where the degree of substitution is less than 3, and fully substituted alpha-D-glucose rings in cases where the degree of substitution is 3. As used herein, the term "randomly substituted" means the substituents on the glucose rings in the randomly substituted polysaccharide occur in a non-repeating or random fashion. That is, the substitution on a substituted glucose ring may be the same or different [i.e. the substituents (which may be the same or different) on different atoms in the glucose rings in the polysaccharide] from the substitution on a second substituted glucose ring in the polysaccharide, such that the overall substitution on the polymer has no pattern. Further, the substituted glucose rings occur randomly within the polysaccharide (i.e., there is no pattern with the substituted and unsubstituted glucose rings within the polysaccharide).

The composition can be in the form of a liquid, a gel, a powder, a hydrocolloid, an aqueous solution, a granule, a tablet, a capsule, a single compartment sachet or a multi-compartment sachet. In some embodiments, the composition is in the form of a liquid, a gel, a powder, a single compartment sachet or a multi-compartment sachet.

Derivatives of Polysaccharides A, B and/or C

The polysaccharide derivatives can be produced from the corresponding polysaccharides A, B, and/or C using known methods. For example, contact of the polysaccharide A, B and/or C with an epoxide, for example, ethylene oxide or propylene oxide in the presence of a base can produce a polysaccharide derivative comprising an ether wherein the ether group comprises a hydroxyl group. The hydroxyl group may undergo further reaction with an epoxide molecule, producing a polyether having two or more ether repeat units. Depending on the molar amounts of the epoxide or the polysaccharides A, B and/or C, one or more of the hydroxyl groups of the polysaccharides can be monoalkoxylated or polyalkoxylated.

In other embodiments, contact of polysaccharide A, B, and/or C with epichlorohydrin in the presence of a base, followed by contact of at least a portion of the epoxide groups with an amine or polyamine can produce a polysaccharide derivative having both amine and hydroxyl functional groups.

In other embodiments, contact of the polysaccharide A, B and/or C with an alkyl chloroacetate or an alkyl chloroformate, for example, methyl chloroacetate, ethyl chloroacetate, methyl chloroformate or ethyl chloroformate in the presence of a base can result in the formation of an ester functional polysaccharide derivative. Subsequent contact of at least a portion of the ester groups with an amine or a polyamine, can result in a polysaccharide derivative comprising an amide functional group or a derivative comprising both amide and amine functional groups.

In other embodiments, contact of the polysaccharide A, B and/or C with acrylonitrile can result in a cyano-functional polysaccharide derivative. At least a portion of the cyano groups can be reduced, using hydrogen and a catalyst or another reducing agent to produce an amine functional polysaccharide derivative. Alternatively, at least a portion of the cyano groups can be treated with hydroxyl amine to form an amidoxime, that is, a group having the formula —C(NOH)NR$^8$R$^9$. At least a portion of the amine group(s) can subsequently treated with an epoxide, for example, ethylene oxide or propylene oxide, to produce a polysaccharide derivative substituted with an alkoxylated amine.

In other embodiments, at least a portion of the cyano groups can be treated with a base to form a carboxylic acid functional polysaccharide derivative. If less than a stoichiometric amount of the cyano groups are treated to form the carboxylic acid group, at least a portion of the remaining cyano groups can be reduced as discussed above, or treated with hydroxyl amine to form an amidoxime. Polysaccharide derivatives having both carboxylic acid functional groups and amine functional groups can be useful due to the solubility in a wide range of pH values.

In other embodiments, polysaccharide A, B, and/or C can be treated with a leaving group, for example, tosyl chloride, in the presence of a base. The product can then be treated with an amine or a polyamine.

In other embodiments, polysaccharide A, B, and/or C having a hydroxyl group on the carbon atom at the 6-position can be oxidized to form a carboxylic acid and/or aldehyde functional polysaccharide derivative. At least a portion of the aldehyde groups can be contacted with an amine or a polyamine to form an imine, which can then be reduced, for example, with sodium cyanoborohydride, to form an amine or polyamine functional polysaccharide derivative. If desired, any of the carboxylic acid functional groups can be contacted with an amine or a polyamine, using known methods, to form an amide or an amine functional amide. In other embodiments, the carboxylic acid functional group can be contacted with an epoxide, to form a polyether.

In still further embodiments, any of the amines or polyamines discussed above can be subsequently contacted with one or more epoxy functional molecules, for example, ethylene oxide, propylene oxide and/or butylene oxide to form alkoxylated amines. Alternatively, prior to contacting the amine or polyamine with the polysaccharides A, B, and/or C or the polysaccharide derivative, the amine or the polyamine can first be contacted with an epoxy functional molecule to form an alkoxylated amine. In further embodiments, one or more of the amines can be contacted with both ethylene oxide and propylene oxide, forming a polyether containing blocks of ethylene glycol and blocks of propylene glycol or a random polyether comprising both ethylene and propylene glycol repeat units.

In some embodiments, the degree of substitution for any one non-hydrogen $R^2$, $R^3$, $R^4$ or $R^6$ is in the range of from 0.1 to 3.0. In other embodiments, the degree of substitution can be in the range of from 0.1 to 2.5 or from 0.1 to 2.0 or from 0.2 to 2.0. The polysaccharide derivative can have one or more repeat units according to the formula (—CH$_2$CH$_2$O—)$_{2-100}$, (—CH$_2$CH(CH$_3$)O—)$_{2-100}$, ((CH$_2$)$_{2-6}$NH)$_q$, or a combination thereof, wherein q is 0 to 12. In some embodiments, q is 1 to 12, or 1 to 10. The term ((CH$_2$)$_{2-6}$NH) can also be expressed as ((CH$_2$)$_y$NH) wherein y is from 2 to 6 inclusive. As used herein, the subscript designating a range of values will be used to designate the potential number of repeat units, for example, (CH$_2$CH$_2$O)$_{2-100}$ means a polyether group containing in the range of from 2 to 100 repeat units. In some embodiments, $R^6$ is —CH$_2$OCH$_2$CH$_2$C(O)NH(CH$_2$)$_2$NH$_2$, —CH$_2$OCH$_2$CH(OH)CH$_2$NH(CH$_2$)$_2$NH$_2$, —CH$_2$O(CH$_2$CH$_2$O)$_{2-100}$H, —CH$_2$O(CH$_2$CH(CH$_3$)O)$_{2-100}$H, —CH$_2$OCH$_2$CH(OH)CH$_2$NH—R$^7$—(N(R$^8$)—R$^7$)$_{0-12}$—NH$_2$, —CH$_2$NH(CH$_2$)$_{2-6}$NH$_2$, —C(O)NH(CH$_2$)$_{2-6}$NH$_2$, —CH$_2$OC(O)NH(CH$_2$)$_{2-6}$NH$_2$, —CH$_2$OCH$_2$CH$_2$C(O)NH(CH$_2$)$_{2-6}$NH(CH$_2$CH$_2$O)$_{2-100}$H, —CH$_2$OCH$_2$CH$_2$C(O)NH(CH$_2$)$_{2-6}$NH(CH$_2$CH(CH$_3$)O)$_{2-100}$H, —CH$_2$OCH$_2$CH(OH)CH$_2$NH(CH$_2$)$_{2-6}$NH(CH$_2$CH$_2$O)$_{2-100}$H, —CH$_2$OCH$_2$CH(OH)CH$_2$NH(CH$_2$)$_{2-6}$NH(CH$_2$CH(CH$_3$)O)$_{2-100}$H, —CH$_2$OCH$_2$CH(OH)CH$_2$NH—R$^7$—(N(R$^8$)—R$^7$)$_{0-12}$—NH(CH$_2$CH$_2$O)$_{2-100}$H, —CH$_2$OCH$_2$CH(OH)CH$_2$NH—R$^7$—(N(R$^8$)—R$^7$)$_{0-12}$—NH(CH$_2$CH(CH$_3$)O)$_{2-100}$H, —CH$_2$NH(CH$_2$CH$_2$O)$_{1-100}$CH$_2$CH$_2$NH$_2$, —CH$_2$NH(CH$_2$CH(CH$_3$)O)$_{1-100}$CH$_2$CH$_2$NH$_2$, —CH$_2$NH(CH$_2$CH$_2$O)$_{1-100}$CH$_2$CH$_2$NH(CH$_2$CH$_2$O)$_{1-100}$H, —CH$_2$NH(CH$_2$CH(CH$_3$)O)$_{1-100}$CH$_2$CH$_2$NH(CH$_2$CH(CH$_3$)O)$_{1-100}$H, —CH$_2$NH$_2$NHC(O)(CH$_2$CH$_2$O)$_{1-100}$C(O)NHNH$_2$, —CH$_2$NH$_2$NHC(O)(CH$_2$CH(CH$_3$)O)$_{1-100}$C(O)NHNH$_2$, —CH$_2$NH$_2$NHC(O)(CH$_2$CH$_2$O)$_{1-100}$C(O)NHNH(CH$_2$CH$_2$O)$_{1-100}$H, —CH$_2$NH2NHC(O)(CH$_2$CH(CH$_3$)O)$_{1-100}$C(O)NHNH(CH$_2$CH(CH$_3$)O)$_{1-100}$H, —CH$_2$NH(CH$_2$)$_{2-6}$NH(CH$_2$CH$_2$O)$_{2-100}$H, —CH$_2$NH(CH$_2$)$_{2-6}$NH(CH$_2$CH(CH$_3$)O)$_{2-100}$H, —C(O)NH(CH$_2$)$_{2-6}$NH(CH$_2$CH$_2$O)$_{2-100}$H, —C(O)NH(CH$_2$)$_{2-6}$NH(CH$_2$CH(CH$_3$)O)$_{2-100}$H, —CH$_2$OC(O)NH(CH$_2$)$_{2-6}$NH(CH$_2$CH$_2$O)$_{2-100}$H, —CH$_2$OC(O)NH(CH$_2$)$_{2-6}$NH(CH$_2$CH(CH$_3$)O)$_{2-100}$H or a combination thereof. In some embodiments, $R_2$, $R_3$ and $R_4$ are independently —(CH$_2$CH$_2$O)$_{2-100}$H, —(CH$_2$CH(CH$_3$)O)$_{2-100}$H, —CH$_2$CH$_2$C(O)NH(CH$_2$)$_{2-6}$NH$_2$, —CH$_2$CH(OH)CH$_2$NH(CH$_2$)$_{2-6}$NH$_2$, —CH$_2$CH(OH)CH$_2$NH—R$^7$—(N(R$^8$)—R$^7$)$_{0-12}$—NH$_2$, —CH$_2$CH$_2$C(O)NH(CH$_2$)$_{2-6}$NH(CH$_2$CH$_2$O)$_{2-100}$H, —CH$_2$CH$_2$C(O)NH(CH$_2$)$_{2-6}$NH(CH$_2$CH(CH$_3$)O)$_{2-100}$H, —CH$_2$CH(OH)CH$_2$NH(CH$_2$)$_{2-6}$NH(CH$_2$CH$_2$O)$_{2-100}$H, —CH$_2$CH(OH)CH$_2$NH(CH$_2$)$_{2-6}$NH(CH$_2$CH(CH$_3$)O)$_{2-100}$H, —CH$_2$CH(OH)CH$_2$NH—R$^7$—(N(R$^8$)—R$^7$)$_{0-12}$—NH(CH$_2$CH$_2$O)$_{2-100}$H, —CH$_2$CH(OH)CH$_2$NH—R$^7$—(N(R$^8$)—R$^7$)$_{0-12}$—NH(CH$_2$CH(CH$_3$)O)$_{2-100}$H, —C(O)NH(CH$_2$)$_{2-6}$NH(CH$_2$CH$_2$O)$_{2-100}$H, —C(O)NH(CH$_2$)$_{2-6}$NH(CH$_2$CH(CH$_3$)O)$_{2-100}$H, —CH$_2$OC(O)NH(CH$_2$)$_{2-6}$NH(CH$_2$CH$_2$O)$_{2-100}$H, —CH$_2$OC(O)NH(CH$_2$)$_{2-6}$NH(CH$_2$CH(CH$_3$)O)$_{2-100}$H, or a combination thereof. In some embodiments, the polysaccharide derivative comprises a polysaccharide substituted with —CH$_2$OCH$_2$CH(OH)CH$_2$NH(CH$_2$)$_{2-6}$NH(CH$_2$CH(CH$_3$)O)$_{2-100}$H, and/or —CH$_2$OCH$_2$CH(OH)CH$_2$NH—R$^7$—(N(R$^8$)—R$^7$)$_{0-12}$—NH(CH$_2$CH$_2$O)$_{2-100}$H.

Detergent Composition

Depending upon the desired application, the polysaccharide derivative can be formulated, for example, blended, mixed, incorporated into, with one or more other materials and/or active ingredients suitable for use in laundry care, textile/fabric care, and/or personal care products. The term "composition comprising the polysaccharide derivative" in this context may include, for example, aqueous formulations comprising the polysaccharide derivative, rheology modifying compositions, fabric treatment/care compositions, laundry care formulations/compositions, fabric softeners or personal care compositions (hair, skin and oral care).

In some embodiments, compositions comprising the polysaccharide derivative can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

The composition can be in any useful form, for example, as powders, granules, pastes, bars, unit dose, or liquid. A liquid detergent composition may be aqueous, typically containing up to about 70% by weight of water and 0% to about 30% by weight of organic solvent. It may also be in the form of a compact gel type containing less than or equal to 30% by weight water.

The polysaccharide derivative comprising one or more poly ether groups, one or more polyamine groups, or a combination thereof can be used as an ingredient in the desired product or may be blended with one or more additional suitable ingredients and used as, for example, fabric care applications, laundry care applications, and/or personal care applications. Any of the disclosed compositions, for example, a fabric care, a laundry care or a personal care composition can comprise in the range of 0.01 to 99 percent by weight of the polysaccharide derivative, based on the total dry weight of the composition (dry solids basis). The term "total dry weight" means the weight of the composition excluding any solvent, for example, any water that might be present. In other embodiments, the composition comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the polysaccharide derivative, wherein the percentages by weight are based on the total dry weight of the corn position.

The corn position can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof. In some embodiments, the composition can further comprise at least one of a colorant, a fluorescer, a fabric conditioner, a hydrolysable surfactant, a preservative, an anti-shrinkage agent, an anti-wrinkle agent, a germicide, a fungicide, a processing aid, a pH control agent, a fabric softener, a solubilizing agent, an enzyme stabilizer, a hydrotope, a carrier, a filler, or a combination thereof.

The composition can be a detergent composition useful for, for example, fabric care, laundry care and/or personal care and may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases, metalloproteases, phosphatases, lactases, cellobiohydrolases, alpha-galactosidases, beta-galactosidases, galactanases, lysozymes, or a combination thereof. If an enzyme(s) is included, it may be present in the composition at about 0.0001 to 0.1% by weight of the active enzyme, based on the total weight of the composition. In other embodiments, the enzyme can be present at about 0.01 to 0.03% by weight of the active enzyme (e.g., calculated as pure enzyme protein) based on the total weight of the composition. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof.

In some embodiments, the composition can comprise one or more enzymes, each enzyme present from about 0.00001% to about 10% by weight, based on the total weight of the composition. In some embodiments, the composition can also comprise each enzyme at a level of about 0.0001% to about 10%, about 0.001% to about 5%, about 0.001% to about 2% or about 0.005% to about 0.5% by weight, based on the total weight of the composition.

In one embodiment, the enzyme can comprise at least one protease. In one embodiment, the composition can comprise one or more proteases. In one embodiment, the protease is a serine protease. In another embodiment, the protease is an alkaline microbial protease or a trypsin-like protease. Suitable proteases include those of animal, vegetable, or microbial origin. In some embodiments, the protease is a microbial protease. In other embodiments, the protease is a chemically or genetically modified mutant.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera Bacillus, Pseudomonas, Streptomyces, Trichoderma, Hum icola, Fusarium, Thielavia and Acremonium. As other examples, the cellulase may be derived from Humicola insolens, Myceliophthora thermophile, Fusarium oxysporum, Trichoderma reesei or a combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes A/S); CLAZINASE® and PURADAX® HA and REVITALENZTM (DuPont Industrial Biosciences), BIOTOUCH® (AB Enzymes); and KAC-500(B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t1/2) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, ALCALASE® ULTRA, BLAZE®, BLAZE® EVITY®, BLAZE EVITY® 16L, CORONASE®, SAVINASE®, SAVINASE® ULTRA, SAVINASE® EVITY®, SAVINASE® EVERIS®, PRIMASE®, DURAZYM™, POLARZYME®, OVOZYME®, KAN NASE®, LIQUANASE®, EVERIS®, NEUTRASE®, RELASE® and ESPERASE® (Novozymes); BLAP™ and BLAP™ variants (Henkel Kommanditgesellschaft auf Aktien, Duesseldorf, Germany), and KAP (B. alkalophilus subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0% to about 50% by weight of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide.

The composition can further comprise one or more detergent builders or builder systems. In some embodiments incorporating at least one builder, the compositions comprise at least about 1%, from about 3% to about 60% or from about 5% to about 40% by weight of the builder, based on the total weight of the composition. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof. In some embodiments in which at least one chelating agent is used, the compositions of the present invention comprise from about 0.1% to about 15% or even from about 3.0% to about 10% by weight of the chelating agent, based on the total weight of the composition.

The composition can further comprise at least one deposition aid. Suitable deposition aids include, for example, polyethylene glycol, polypropylene glycol, polycarboxylate, soil release polymers such as polytelephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP) and derivatives thereof or a combination thereof. In embodiments in which at least one dye transfer inhibiting agent is used, the compositions can comprise from about 0.0001% to about 10%, from about 0.01% to about 5%, or even from about 0.1% to about 3% by weight of the dye transfer inhibiting agent, based on the total weight of the composition.

The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition. In other embodiments, silicates can be present at a level of from about 5% to about 15% by weight, based on the total weight of the composition.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present polysaccharide derivatives. Examples of other types of polymers useful herein include carboxymethyl cellulose (CMC), poly(vinylpyrrolidone) (PVP), polyethylene glycol (PEG), poly (vinyl alcohol) (PVA), polycarboxylates such as polyacrylates, maleic/acrylic acid copolymers, and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthenes dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibitors, optical brighteners, or perfumes. The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition. In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulphobetaines); ampholytic surfactants; semi-polar non-ionic surfactants and mixtures thereof.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The heavy duty laundry detergent composition can optionally further include saturated or unsaturated fatty acids, preferably saturated or unsaturated C12-C24 fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or a combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

In addition to the polysaccharide derivative, dishwashing detergent compositions can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10% by weight; (ii) a builder, in the range of about 5 to 60% by weight, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 to 50% by weight, or sulfonated/carboxylated polymers in the range of about 0.1° A to about 50% by weight; (iii) a drying aid in the range of about 0.1% to about 10% by weight (e.g., polyesters, especially anionic polyesters, optionally together with further monomers with 3 to 6 functionalities, for example, acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1% to about 20% by weight (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach, for example, organic peroxyacids such as diacyl- and tetraacylperoxides, especially diperoxydodecanedioic acid, diperoxytetradecanedioic acid, and diperoxyhexadecanedioic acid; (vi) a bleach activator, for example, organic peracid precursors in the range from about 0.1% to about 10% by weight and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1% to 5% by weight, for example, benzatriazoles, metal salts and complexes, and/or silicates; and/or (viii) any active enzyme disclosed herein in the range from about 0.01 to 5.0 mg of active enzyme per gram of automatic dishwashing detergent composition, and an enzyme stabilizer component. The percentages by weight are based on the total weight of the composition.

Various examples of detergent formulations comprising at least one polysaccharide derivative are disclosed below (1-19):

1) A detergent composition formulated as a granulate having a bulk density of at least 600 g/L comprising: linear alkylbenzenesulfonate (calculated as acid) at about 7 to 12% by weight; alcohol ethoxysulfate (e.g., $C_{12}$-$C_{18}$ alcohol, 1-2 ethylene oxide [EO]) or alkyl sulfate (e.g., $C_{16}$-$C_{18}$) at about 1 to 4% by weight; alcohol ethoxylate (e.g., $C_{14}$-$C_{15}$ alcohol) at about 5 to 9% by weight; sodium carbonate at about 14 to 20% by weight; soluble silicate (e.g., $Na_2O_2SiO_2$) at about 2 to 6% by weight; zeolite (e.g., $NaAlSiO_4$) at about 15 to 22% by weight; sodium sulfate at about 0 to 6% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

2) A detergent composition formulated as a granulate having a bulk density of at least 600 g/L comprising: linear alkylbenzenesulfonate (calculated as acid) at about 6 to 11% by weight; alcohol ethoxysulfate (e.g., $C_{12}$-$C_{18}$ alcohol, 1-2 EO) or alkyl sulfate (e.g., $C_{16}$-$C_{18}$) at about 1 to 3% by weight; alcohol ethoxylate (e.g., $C_{14}$-$C_{15}$ alcohol) at about 5 to 9% by weight; sodium carbonate at about 15 to 21% by weight; soluble silicate (e.g., $Na_2O\ 2SiO_2$) at about 1 to 4% by weight; zeolite (e.g., $NaAlSiO_4$) at about 24 to 34% by weight; sodium sulfate at about 4 to 10% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 1 to 6% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

3) A detergent composition formulated as a granulate having a bulk density of at least 600 g/L comprising: linear alkylbenzenesulfonate (calculated as acid) at about 5 to 9% by weight; alcohol ethoxysulfate (e.g., $C_{12}$-$C_{18}$ alcohol, 7 EO) at about 7 to 14% by weight; soap as fatty acid (e.g., $C_{16}$-$C_{22}$ fatty acid) at about 1 to 3% by weight; sodium carbonate at about 10 to 17% by weight; soluble silicate (e.g., $Na_2O_2SiO_2$) at about 3 to 9% by weight; zeolite (e.g., $NaAlSiO_4$) at about 23 to 33% by weight; sodium sulfate at about 0 to 4% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1° A by weight; and minor ingredients (e.g., suds suppressors, perfumes, optical brightener) at about 0 to 5% by weight.

4) A detergent composition formulated as a granulate having a bulk density of at least 600 g/L comprising: linear alkylbenzene sulfonate (calculated as acid) at about 8 to 12% by weight; alcohol ethoxylate (e.g., $C_{12}$-$C_{18}$ alcohol, 7 EO) at about 10 to 25% by weight; sodium carbonate at about 14 to 22% by weight; soluble silicate (e.g., $Na_2O_2SiO_2$) at about 1 to 5% by weight; zeolite (e.g., $NaAlSiO_4$) at about 25 to 35% by weight; sodium sulfate at about 0 to 10% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 1 to 3% by weight; optionally an enzyme(s) (calculated as pure enzyme protein) at about 0.0001 to 0.1% by weight; and minor ingredients (e.g., suds suppressors, perfumes) at about 0 to 5% by weight.

5) An aqueous liquid detergent composition comprising: linear alkylbenzenesulfonate (calculated as acid) at about 15 to 21% by weight; alcohol ethoxylate (e.g., $C_{12}$-$C_{18}$ alcohol, 7 EO; or $C_{12}$-$C_{15}$ alcohol, 5 EO) at about 12 to 18% by weight; soap as fatty acid (e.g., oleic acid) at about 3 to 13% by weight; alkenylsuccinic acid ($C_{12}$-$C_{14}$) at about 0 to 13% by weight; aminoethanol at about 8 to 18% by weight; citric acid at about 2 to 8% by weight; phosphonate at about 0 to 3% by weight;

polysaccharide derivative up to about 2% by weight; other polymers (e.g., PVP, PEG) at about 0 to 3% by weight; borate at about 0 to 2% by weight; ethanol at about 0 to 3% by weight; propylene glycol at about 8 to 14% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

6) An aqueous structured liquid detergent composition comprising: linear alkylbenzenesulfonate (calculated as acid) at about 15 to 21% by weight; alcohol ethoxylate (e.g., $C_{12}$-$C_{18}$ alcohol, 7 EO; or $C_{12}$-$C_{15}$ alcohol, 5 EO) at about 3 to 9% by weight; soap as fatty acid (e.g., oleic acid) at about 3 to 10% by weight; zeolite (e.g., $NaAlSiO_4$) at about 14 to 22% by weight; potassium citrate about 9 to 18% by weight; borate at about 0 to 2% by weight; polysaccharide derivative up to about 2% by weight; other polymers (e.g., PVP, PEG) at about 0 to 3% by weight; ethanol at about 0 to 3% by weight; anchoring polymers (e.g., lauryl methacrylate/acrylic acid copolymer, molar ratio 25:1, MW 3800) at about 0 to 3% by weight; glycerol at about 0 to 5% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

7) A detergent composition formulated as a granulate having a bulk density of at least 600 g/L comprising: fatty alcohol sulfate at about 5 to 10% by weight, ethoxylated fatty acid monoethanolamide at about 3 to 9% by weight; soap as fatty acid at about 0 to 3% by weight; sodium carbonate at about 5 to 10% by weight; soluble silicate (e.g., $Na_2O_2SiO_2$) at about 1 to 4% by weight; zeolite (e.g., $NaAlSiO_4$) at about 20 to 40% by weight; sodium sulfate at about 2 to 8% by weight; sodium perborate at about 12 to 18% by weight; TAED at about 2 to 7% by weight; polysaccharide derivative up to about 2% by weight; other polymers (e.g., maleic/acrylic acid copolymer, PEG) at about 1 to 5% by weight; optionally an enzyme(s) (calculated as pure enzyme protein) at about 0.0001 to 0.1° A by weight; and minor ingredients (e.g., optical brightener, suds suppressors, perfumes) at about 0 to 5% by weight.

8) A detergent composition formulated as a granulate comprising: linear alkylbenzenesulfonate (calculated as acid) at about 8 to 14% by weight; ethoxylated fatty acid monoethanolamide at about 5 to 11% by weight; soap as fatty acid at about 0 to 3% by weight; sodium carbonate at about 4 to 10% by weight; soluble silicate (e.g., $Na_2O_2SiO_2$) at about 1 to 4% by weight; zeolite (e.g., $NaAlSiO_4$) at about 30 to 50% by weight; sodium sulfate at about 3 to 11% A by weight; sodium citrate at about 5 to 12% by weight; polysaccharide derivative up to about 2% by weight; other polymers (e.g., PVP, maleic/acrylic acid copolymer, PEG) at about 1 to 5% by weight; optionally an enzyme(s) (calculated as pure enzyme protein) at about 0.0001 to 0.1% by weight; and minor ingredients (e.g., suds suppressors, perfumes) at about 0 to 5% by weight.

9) A detergent composition formulated as a granulate comprising: linear alkylbenzenesulfonate (calculated as acid) at about 6 to 12% by weight; nonionic surfactant at about 1 to 4% by weight;

soap as fatty acid at about 2 to 6% by weight; sodium carbonate at about 14 to 22% by weight; zeolite (e.g., $NaAlSiO_4$) at about 18 to 32% by weight; sodium sulfate at about 5 to 20% by weight; sodium citrate at about 3 to 8% by weight; sodium perborate at about 4 to 9% by weight; bleach activator (e.g., NOBS or TAED) at about 1 to 5% by weight; polysaccharide derivative up to about 2% by weight; other polymers (e.g., polycarboxylate or PEG) at about 1 to 5% by weight; optionally an enzyme(s) (calculated as pure enzyme protein) at about 0.0001 to 0.1% by weight; and minor ingredients (e.g., optical brightener, perfume) at about 0 to 5% by weight.

10) An aqueous liquid detergent composition comprising: linear alkylbenzenesulfonate (calculated as acid) at about 15 to 23% by weight; alcohol ethoxysulfate (e.g., $C_{12}$-$C_{15}$ alcohol, 2-3 EO) at about 8 to 15% by weight; alcohol ethoxylate (e.g., $C_{12}$-$C_{15}$ alcohol, 7 EO; or $C_{12}$-$C_{15}$ alcohol, 5 EO) at about 3 to 9% by weight; soap as fatty acid (e.g., lauric acid) at about 0 to 3% by weight; aminoethanol at about 1 to 5% by weight; sodium citrate at about 5 to 10% by weight; hydrotrope (e.g., sodium toluenesulfonate) at about 2 to 6% by weight; borate at about 0 to 2% by weight; polysaccharide derivative up to about 1% by weight; ethanol at about 1 to 3% by weight; propylene glycol at about 2 to 5% by weight; optionally an enzyme(s) (calculated as pure enzyme protein) at about 0.0001 to 0.1° A by weight; and minor ingredients (e.g., dispersants, perfume, optical brighteners) at about 0 to 5% by weight.

11) An aqueous liquid detergent composition comprising: linear alkylbenzenesulfonate (calculated as acid) at about 20 to 32% by weight; alcohol ethoxylate (e.g., $C_{12}$-$C_{15}$ alcohol, 7 EO; or $C_{12}$-$C_{15}$ alcohol, 5 EO) at about 6 to 12% by weight; aminoethanol at about 2 to 6% by weight; citric acid at about 8 to 14% by weight; borate at about 1 to 3% by weight; polysaccharide derivative up to about 2% by weight; ethanol at about 1 to 3% by weight; propylene glycol at about 2 to 5% by weight; other polymers (e.g., maleic/acrylic acid copolymer, anchoring polymer such as lauryl methacrylate/acrylic acid copolymer) at about 0 to 3% by weight; glycerol at about 3 to 8% by weight; optionally an enzyme(s) (calculated as pure enzyme protein) at about 0.0001 to 0.1% by weight; and minor ingredients (e.g., hydrotropes, dispersants, perfume, optical brighteners) at about 0 to 5% by weight.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25 to 40% by weight; nonionic surfactant (e.g., alcohol ethoxylate) at about 1 to 10% by weight; sodium carbonate at about 8 to 25% by weight; soluble silicate (e.g., $Na_2O_2SiO_2$) at about 5 to 15% by weight; sodium sulfate at about 0 to 5% by weight; zeolite ($NaAlSiO_4$) at about 15 to 28% by weight; sodium perborate at about 0 to 20% by weight; bleach activator (e.g., TAED or NOBS) at about 0 to 5% by weight; polysaccharide derivative up to about 2% by weight; optionally an enzyme(s) (calculated as pure enzyme protein) at about 0.0001 to 0.1% by weight; and minor ingredients (e.g., perfume, optical brighteners) at about 0 to 3% by weight.

13) Detergent compositions as described in (1)-(12) above, but in which all or part of the linear alkylbenzenesulfonate is replaced by $C_{12}$-$C_{18}$ alkyl sulfate.

14) A detergent composition formulated as a granulate having a bulk density of at least 600 g/L comprising: $C_{12}$-$C_{18}$ alkyl sulfate at about 9 to 15% by weight; alcohol ethoxylate at about 3 to 6% by weight; polyhydroxy alkyl fatty acid amide at about 1 to 5% by weight; zeolite (e.g., $NaAlSiO_4$) at about 10 to 20% by weight; layered disilicate (e.g., SK56 from Hoechst) at about 10 to 20% by weight; sodium carbonate at about 3 to 12% by weight;

soluble silicate (e.g., $Na_2O_2SiO_2$) at 0 to 6% by weight; sodium citrate at about 4 to 8% by weight; sodium percarbonate at about 13 to 22% by weight; TAED at about 3 to 8% by weight; polysaccharide derivative up to about 2% by weight; other polymers (e.g., polycarboxylates and PVP) at about 0 to 5% by weight; optionally an enzyme(s) (calculated as pure enzyme protein) at about 0.0001 to 0.1% by weight; and minor ingredients (e.g., optical brightener, photobleach, perfume, suds suppressors) at about 0 to 5% by weight.

15) A detergent composition formulated as a granulate having a bulk density of at least 600 g/L comprising: $C_{12}$-$C_{18}$ alkyl sulfate at about 4 to 8% by weight; alcohol ethoxylate at about 11 to 15% by weight; soap at about 1 to 4% by weight; zeolite MAP or zeolite A at about 35 to 45% by weight; sodium carbonate at about 2 to 8% by weight; soluble silicate (e.g., $Na_2O_2SiO_2$) at 0 to 4% by weight; sodium percarbonate at about 13 to 22% by weight; TAED at about 1 to 8% by weight; polysaccharide derivative up to about 3% by weight; other polymers (e.g., polycarboxylates and PVP) at about 0 to 3% by weight; optionally an enzyme(s) (calculated as pure enzyme protein) at about 0.0001 to 0.1% by weight; and minor ingredients (e.g., optical brightener, phosphonate, perfume) at about 0 to 3% by weight.

16) Detergent formulations as described in (1) to (15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant, for example, a linear alkoxylated primary alcohol, a builder system (e.g., phosphate), polysaccharide derivative, optionally an enzyme(s), and alkali. The detergent may also comprise an anionic surfactant and/or bleach system.

In other embodiments, the disclosure relates to a method of treating a substrate, for example, clothing, a fabric or a textile, the method comprising:
  i) providing a composition, wherein the composition comprises a polysaccharide derivative; and
  ii) contacting the substrate with the composition; and
  iii) optionally rinsing the substrate,
  wherein the polysaccharide derivative is substituted with:
    a) one or more polyamine groups;
    b) one or more polyether groups; or
    c) a combination of a) and b).

In other embodiments of the above method, the substrate is a textile, a fabric, a carpet or apparel and the treatment provides a benefit to the substrate, for example, one or more of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, or a combination thereof.

A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelasse, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

The step of contacting can be performed at a variety of conditions, for example, times, temperatures, wash/rinse volumes. Methods for contacting a fabric or textile substrate, for example, a fabric care method or laundry method are generally well known. For example, a material comprising fabric can be contacted with the disclosed composition: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0% by weight; or any combination of (i)-(iv). The contacting step in a fabric care method or laundry method can comprise any of washing, soaking, and/or rinsing steps, for example. In some embodiments, the rinsing step is a step of rinsing with water.

Other substrates that can be contacted include, for example, surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

Certain embodiments of a method of treating a substrate further comprise a drying step, in which a material is dried after being contacted with the composition. The drying step can be performed directly after the contacting step, or following one or more additional steps that might follow the contacting step, for example, drying of a fabric after being rinsed, in water for example, following a wash in an aqueous composition. Drying can be performed by any of several means known in the art, such as air drying at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein.

Non-limiting examples of the embodiments disclosed herein include:
1. A composition comprising a polysaccharide derivative wherein the polysaccharide derivative comprises a polysaccharide substituted with:
    a) one or more polyamine groups;
    b) one or more polyether groups; or
    c) a combination of a) and b);
  wherein the polysaccharide is:
    A) a polysaccharide A comprising 25 to 35% alpha-1,3-glycosidic linkages, 55 to 75% alpha-1,6-glycosidic linkages and 5 to 15% alpha-1,3,6-glycosidic linkages, having a weight average molecular weight of less than 5000 Daltons;
    B) a polysaccharide B comprising 10 to 20% alpha-1,4-glycosidic linkages, 30 to 88% by weight alpha-1,6-glycosidic linkages, and 5 to 50% alpha-1,4,6- or alpha-1,2,6-glycosidic linkages, a weight average molecular weight of less than 5000 Daltons;
    C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99.5% alpha-1,6-glycosidic linkages, a weight average molecular weight of less than 300,000 Daltons.
2. The composition of embodiment 1 further comprising at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

3. The composition of any one of embodiments 1 or 2 in the form of a liquid, a gel, a powder, a hydrocolloid, an aqueous solution, a granule, a tablet, a capsule, a single compartment sachet, or a multi-compartment sachet.

4. The composition of any one of embodiments 1, 2 or 3 wherein the polysaccharide A comprises a polydispersity index of less than 5, or wherein the polysaccharide B comprises a polydispersity index of less than 10, or wherein the polysaccharide C has a polydispersity index of less than 26.

5. The composition of any one of embodiments 1, 2, 3 or 4 wherein the one or more polyether group has a repeat unit according to (—$CH_2CH_2O$—), (—$CH_2CH(CH_3)O$—), or a combination thereof.

6. The composition of any one of embodiments 1, 2, 3, 4 or 5 wherein the one or more polyamine group is a linear polyamine, a branched polyamine, or a dendritic polyamine.

7. The composition of any one of embodiments 1, 2, 3, 4, 5 or 6 wherein the at least one polyamine group is terminated with one or more polyether groups.

8. The composition of any one of embodiments 1, 2, 3, 4, 5, 6 or 7 wherein the polyether group has a degree of polymerization in the range of from 2 to 100.

9. The composition of any one of embodiments 1, 2, 3, 4, 5, 6, 7, or 8 wherein the one or more polyamine groups have a repeat unit according to (($CH_2)_y$NH), wherein y is from 2 to 6 inclusive.

10. The composition of any one of embodiments 1, 2, 3, 4, 5, 6, 7, 8, or 9 wherein the polysaccharide derivative comprises a polysaccharide substituted with —$CH_2OCH_2CH(OH)CH_2NH(CH_2)_{2-6}NH(CH_2CH(CH_3)O)_{2-100}H$, and/or —$CH_2OCH_2CH(OH)CH_2NH$—$R^7$—(N($R^8$)—$R^7)_{0-12}$—$NH(CH_2CH_2O)_{2-100}H$.

11. The composition of any one of embodiments 1, 2, 3, 4, 5, 6, 7, 8, or 9 wherein wherein the one or more polyamine groups comprise a radical represented by Structure 5c:

Structure 5c

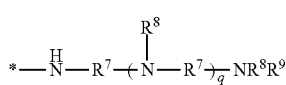

wherein
each $R^7$ is independently a $C_1$ to $C_{12}$ alkylene, optionally substituted with hydroxyl;
each $R^8$ or $R^9$ is independently hydrogen, $C_1$ to $C_{12}$ alkyl, (—$R^7O$—)$_x$H, a polyamine, or (—$R^7$—$NR^{11})_qR^{12}$;
each $R^{11}$ or $R^{12}$ is independently hydrogen, $R^{10}$, or (—$R^7O)_x$H;
each $R^{10}$ is independently hydrogen, $C_1$ to $C_{12}$ alkyl, or a cation;
each x is independently 2 to 100; and
q is 0 to 12.

12. The composition of any one of embodiments 1, 2, 3, 4, 5, 6, 7, 8, 9, 10, or 11 wherein the enzyme comprises at least one protease.

13. A method for treating a substrate comprising:
  i) providing a composition, wherein the composition comprises a polysaccharide derivative;
  ii) contacting the substrate with the composition; and
  iii) optionally rinsing the substrate;
wherein the polysaccharide derivative comprises a polysaccharide substituted with:
  a) one or more polyamine groups;
  b) one or more polyether groups; or
  c) a combination of a) and b);
wherein the polysaccharide is:
  A) a polysaccharide A comprising 25 to 35% alpha-1,3-glycosidic linkages, 55 to 75% alpha-1,6-glycosidic linkages and 5 to 15% alpha-1,3,6-glycosidic linkages, and having a weight average molecular weight of less than 5000 Daltons;
  B) a polysaccharide B comprising 10 to 20% alpha-1,4-glycosidic linkages, 60 to 88% by weight alpha-1,6-glycosidic linkages, and 5 to 30% alpha-1,4,6- or alpha-1,2-6-glycosidic linkages, and having a weight average molecular weight of less than 5000 Daltons;
  C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99% alpha-1,6-glycosidic linkages, and having a weight average molecular weight of less than 300,000 Daltons.

14. The method of embodiment 13 wherein the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

15. The method of any one of embodiments 13 or 14 wherein the composition is in the form of a liquid, a gel, a powder, a hydrocolloid, an aqueous solution, a granule, a tablet, a capsule, a single compartment sachet, or a multi-compartment sachet.

16. A substrate treated with a composition comprising a polysaccharide derivative, wherein the polysaccharide derivative comprises a polysaccharide substituted with:
  a) one or more polyamine groups;
  b) one or more polyether groups; or
  c) a combination of a) and b);
wherein the polysaccharide is:
  A) a polysaccharide A comprising 25 to 35% alpha-1,3-glycosidic linkages, 55 to 75% alpha-1,6-glycosidic linkages and 5 to 15% alpha-1,3,6-glycosidic linkages, and having a weight average molecular weight of less than 5000 Daltons;
  B) a polysaccharide B comprising 10 to 20% alpha-1,4-glycosidic linkages, 30 to 88% by weight alpha-1,6-glycosidic linkages, and 5 to 50% alpha-1,4,6- or alpha-1,2,6-glycosidic linkages, and having a weight average molecular weight of less than 5000 Daltons;
  C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99.5% alpha-1,6-glycosidic linkages, and having a weight average molecular weight of less than 300,000 Daltons.

17. The treated substrate of embodiment 16, wherein the composition is any one of embodiments 2, 3, 4, 5, 6, 7, 8, 9, 10, 11, or 12.

EXAMPLES

Preparation of Polysaccharide A

Polysaccharide A can be prepared according to methods found in WO2015/183729, which is herein incorporated by reference in its entirety.

A 1200 milliliter (ml) reaction containing 100 grams/liter (g/L) sucrose, *E. coli* crude protein extract (1.0% v/v) containing GTF enzyme from *Lactobacillus reuteri* identified in GENBANK® as gi:51574154, and 0.01% (v/v) dextranase (1,6-α-D-Glucan 6-glucanhydrolase from *Chaetomium erraticum*, Sigma catalog D-0443) in 10 millilolar (mM) potassium phosphate buffer (pH 6.5), is stirred at 37° C. for 45 hours (h), then heated to 90° C. for 15 min to inactivate the enzymes. The resulting product mixture is centrifuged and the resulting supernatant is analyzed by HPLC for soluble monosaccharides, disaccharides and oligosaccharides, then the supernatant is purified by SEC using BioGel P2 resin (BioRad).

Preparation of Polysaccharide B

Polysaccharide B can be prepared according to the methods found in WO2015/183722, which is herein incorporated by reference in its entirety.

Preparation of Polysaccharide C

Polysaccharide C can be prepared according to the methods found in WO2015/183714, which is herein incorporated by reference in its entirety.

A 2000 milliliter (ml) reaction containing 450 grams/liter (g/L) sucrose, supernatant of B. subtilis fermentation broth (2.0% v/v) containing GTF enzyme SG1115 derived from GENBANK® gi: 335358117, in 50 millilolar (mM) sodium acetate buffer (pH 5.5), was over-head stirred in a 2-liter reactor at 150 rpm, 47° C. for 24 hours (h). The reaction mixture was then heated to 90° C. and maintained for 30 min to deactivate the enzyme. After the reaction mixture was cooled to 30° C., 238.235 grams of sucrose and 200 milliliter of E. coli crude protein extract containing the GtfJ18T1 branching enzyme were added and reaction was continued for 48 hours. The resulting product mixture was centrifuged and the supernatant was cleaned/purified using a PELLICON® Mini Cassette Holder with two 1 KD cassettes. The reaction mixture was also analyzed by HPLC for soluble monosaccharides, disaccharides and oligosaccharides.

Preparation of Polysaccharide Derivatives

Example 1

Cyanoethylation of Polysaccharide A, B or C

A 4-neck, 250 milliliters (mL) round bottom flask containing a mechanical stir rod, thermocouple and addition funnel is charged with 25.0 grams (g) of polysaccharide A, B or C and 67 mL of water. The mixture is stirred at room temperature while 7 g of 50 wt % sodium hydroxide solution is added over a 5-minute period. The resulting mixture is stirred at room temperature for 1 hour. Acrylonitrile (12.9 mL) is added drop-wise at room temperature. The resulting mixture is stirred at room temperature for 5 hours. The precipitated solid is collected by filtering followed by washing with water until pH about 7, drying in air overnight, then in 80° C. vacuum oven for 6 hours to get a white solid, cyanoethylate polysaccharide (CEP).

Example 2

Reduction of Cyanoethyl Polysaccharide (CEP)

The cyanoethylated polysaccharide from Example 1 (1 g) and cobaltous chloride hexahydrate (4 equivalents with respect to cyanoethyl groups) are dissolved in 20 mL water and sodium borohydrate (15 equivalents per cyano groups) is added in portions with stirring at 20° C. The reaction is stirred for 1 hour at room temperature. The precipitate is removed by filtration. The filtrate is purified by membrane ultrafiltration to yield aminated polysaccharide.

Example 3

Amination of Polysaccharide 10 g of the polysaccharide A, B or C wet cake is added to 60 mL of isopropanol in a 250 mL capacity round bottom flask fitted with a thermocouple, a mechanical stirring rod, and additional funnel. NaOH aqueous solution (13.5 mL of 50% aqueous solution) is added. The mixture is stirred at room temperature for 30 minutes and is then heated at 55° C. for one hour. Ethyl chloroacetate (22 mL) is then added drop wise. The reaction is kept at 55° C. for 1.5 hrs.

After that, ethylenediamine (10.8 g) is added drop wise to the above resulting mixture. The reaction is kept at 55° C. for 1.5 hours before being neutralized by 90% acetic acid. The product is collected by vacuum filtration and is washed with methanol (95%) four times and dried under vacuum at 50° C.

Example 4

Amination of Polysaccharide 10 g of the polysaccharide A, B, or C wet cake is added to 60 mL of isopropanol in a 250 mL capacity round bottom flask fitted with a thermocouple, a mechanical stirring rod, and additional funnel. NaOH aqueous solution (13.5 g of 50% aqueous solution) is added. The mixture is stirred at room temperature for 30 minutes and is then heated at 55° C. for one hour. Ethyl acrylate (10 g) is then added drop wise. The reaction is kept at 55° C. for 1.5 hrs.

Ethylenediamine (10.8 g) is added drop wise to the above resulting mixture. The reaction is kept at 55° C. for 1.5 hours before being neutralized by 90% acetic acid. The product is collected by vacuum filtration and is washed with methanol (95%) four times, and dried under vacuum at 50° C.

Example 5

Oxidized Polysaccharide 10 g of the polysaccharide A, B or C wet cake is suspended in 10 mL water, and cooled to −10° C. To this is added a solution of 4-acetamido-TEMPO (0.25 g) and sodium bromide (0.33 g) in 20 mL water. 1.32 g of 50% sodium hydroxide solution is added to the reaction mixture followed by 20.7 g of 12 wt % sodium hypochlorite solution. The reaction mixture is stirred at −4° C. for 1 hour. The reaction mixture is then added into a stirring methanol solution (3× volume). The precipitate is collected and washed with 50% aqueous ethanol (4×), dried under a stream of nitrogen for 30 min, then dried at 40° C. overnight in a vacuum oven to yield white product that is oxidized polysaccharide (carboxylate form).

Example 6

Amination of Polysaccharide Carboxylate

One gram of the oxidized polysaccharide from Example 5 is dissolved in 50 mL water. To this is added 4 g ethylene diamine, followed by 10 g EDC (1-ethyl-3-(3-dimethylaminopropyl)carbodiimide hydrochloride). The mixture is stirred at room temperature for 12 hours. The product is isolated by membrane filtration (MWCO 10kD).

Example 7

Tosylation of Polysaccharide 5 g of polysaccharide A, B or C is dissolved in 100 mL of dimethylacetamide (DMAc) containing 8 g of anhydrous lithium chloride (LiCl). To the dissolved solution is added 14 mL of triethylamine and 10 mL of DMAc. The mixture is cooled to 8° C. and a solution of 10 g of p-toluenesulfonyl chloride in 15 mL DMAc dropwise over 30 min. The mixture is stirred for 24 hrs at 8° C. The solution is poured into 1 L of ice water to precipitate the product. The precipitated is collected, washed with 3 L of water and 500 mL ethanol, and suspended in 500 mL acetone, and re-precipitated into 1 L of water. The precipitate is washed with ethanol, and dried.

Example 8

Amination of Polysaccharide Tosylate

One gram of polysaccharide tosylate from Example 7 is dissolved in 10 mL dimethyl sulfoxide (DMSO). To this is added 4 g ethylene diamine. The mixture is heated to 70° C. for 6 h. The mixture is cooled, and poured into 100 mL of ethanol. The precipitate is collected and washed with 70% aqueous methanol.

Example 9

Oxidized Polysaccharide

Polysaccharide A, B or C wet cake is added to 170 mL of distilled water in a 500 mL round bottom flask. The mixture is stirred for 15 to 30 minutes to produce a solution. 17.7 g of sodium periodate in 160 mL distilled water is added to the solution all at once. The mixture is stirred at room temperature for 5 hours. After this time, the solution is removed from the round bottom flask, divided into four equal volumes and dispensed into 4 dialysis membrane tubes (MWCO=3500 Daltons). Each tube is dialyzed in deionized water for 4 days, during which time the water is changed twice daily. The aqueous solutions can be removed from the dialysis tubes, placed in wide-mouth polyethylene containers and frozen using liquid nitrogen, and lyophilized to afford polysaccharide aldehyde.

Example 10

Amination of Polysaccharide Aldehyde

Five grams of the polysaccharide aldehyde from Example 9 is dissolved in 500 mL 0.1M borate buffer, pH 11. The aldehyde solution is added slowly over 5 hours to a basic solution of hexamethylene diamine in about 300 mL of distilled water. The mixture is stirred at room temperature for 24 hours. Sodium borohydride (4.14 g) is added, the reaction is stirred for 24 hours. The reduction is repeated with another addition of 4.14 g of sodium borohydride, with stirring for another 24 hours. The resulting solution is dialyzed in distilled water (3500 MWCO) for 2 days, with 2 water exchanges, then lyophilized to dryness.

Example 11

Cyanoethylation of Polysaccharide C

A 4-Neck 250 mL round bottom flask was equipped with overhead mechanical stirrer, thermocouple, and $N_2$ inlet. Polysaccharide C [91 g, which contained 28.6 g (176 mmole) of polysaccharide] was added into the flask. NaOH 6.0 g (75 mmole, 50 wt. % in water) was added dropwise over 5-min period, while stirring (18-25° C.). The mixture, a slightly cloudy solution, was stirred at room temperature for 15 minutes. Acrylonitrile 28 g (0.53 mole) was added in 1 hour in portions so that the internal temperature was controlled below 33° C. The reaction mixture was stirred at 29-33° C. for 4 hours. White glue was separated from water phase. The top liquid was decanted and the glue was repeatedly washed with water and pH of the mixture was adjusted with HCl solution during washing. The washed glue was treated with MeOH (200 mL). The glue did not harden. The soft solid was then treated with isopropanol (150 mL) over night. The soft solid was collected and dried on vacuum to give an off-white solid (cyanoethyl polysaccharide, 41 g). Its DoS was about 2 based on elemental analysis results.

Example 12

Tosylation of Polysaccharide C

Dried Polysaccharide C (25% branching, 20 grams) was dissolved in the aqueous solution (de-ionized water, 230 mL) of NaOH (46 gram, 50% concentration) and urea (40 gram). After that, p-toluenesulfonyl chloride (0.49 mol, 94 gram) and polyethylene glycol alkyl ($C_{11}$-$C_{15}$) ether (20 mL) were added. The mixture was stirred vigorously in an ice-bath for at least 3 hours and warmed up to room temperature overnight. The crude product was precipitated and washed thoroughly to afford 39 gram of desired product in quantitative yield. The product was characterized by $^{13}C$ NMR. $^{13}C$ (500 MHz, DMSO-$d_6$, ppm): 144.8, 132.3, 129.8, 127.6, 95.7, 92.5, 80.0-64.2, 60.7, 50.1, 21.1. The degree of substitution (DoS) was measured by elemental analysis to be 0.97.

Example 13

Amination of Polysaccharide Tosylate Using Butyldiamine

This material was produced using a procedure similar to that disclosed in Green Chem., 2014, 16, 1941. Tosylated polysaccharide from Example 12 (20 grams) was used to react with 1,4-butyldiamine (60 mL) which affords 6.8 gram of the desired material after freeze-drying. The structure of the product was characterized by $^{13}C$ NMR. $^{13}C$ (500 MHz, $D_2O$, ppm): 147.2, 130.8, 130.4, 127.9, 97.9, 95.9, 79.5, 75.4, 73.4-65.6, 60.5, 47.0, 38.9, 24.1, 21.1; The degree of substitution was measured by elemental analysis to be DoS (Ts), 0.42 and DoS (Amine), 0.56.

Example 14

Amination of Polysaccharide Tosylate Using Diethylethylenediamine

In another example, tosylated polysaccharide from Example 12 (15 grams) was reacted with N, N-diethylethylenediamine (30 mL) to afford 10.5 gram of the desired material after freeze-drying. The structure of the product was characterized by $^{13}$C NMR. $^{13}$C (500 MHz, D$_2$O, ppm): 146.4, 130.3, 128.0, 97.9, 96.2, 80.4, 73.3-65.3, 60.4, 51.5, 47.8, 42.3, 21.1, 8.3.

The degree of substitution was measured by elemental analysis to be DoS (Ts), 0.52 and DoS (Amine), 0.33.

What is claimed is:

1. A composition comprising a polysaccharide derivative wherein the polysaccharide derivative comprises a polysaccharide substituted with:
   a) one or more polyamine groups;
   b) one or more polyether groups; or
   c) a combination of a) and b);
   wherein the polysaccharide is:
   A) a polysaccharide A comprising 25 to 35% alpha-1,3-glycosidic linkages, 55 to 75% alpha-1,6-glycosidic linkages and 5 to 15% alpha-1,3,6-glycosidic linkages, and having a weight average molecular weight of less than 5000 Daltons;
   B) a polysaccharide B comprising 10 to 20% alpha-1,4-glycosidic linkages, 30 to 88% by weight alpha-1,6-glycosidic linkages, and 5 to 50% alpha-1,4,6- or alpha-1,2,6-glycosidic linkages, and having a weight average molecular weight of less than 5000 Daltons; and/or
   C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99.5% alpha-1,6-glycosidic linkages, and having a weight average molecular weight of less than 300,000 Daltons.

2. The composition of claim 1, further comprising at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

3. The composition of claim 1, in the form of a liquid, a gel, a powder, a hydrocolloid, an aqueous solution, a granule, a tablet, a capsule, a single compartment sachet, or a multi-compartment sachet.

4. The composition of claim 1, wherein the polysaccharide A comprises a polydispersity index of less than 5, or wherein the polysaccharide B comprises a polydispersity index of less than 10, or wherein the polysaccharide C has a polydispersity index of less than 26.

5. The composition of claim 1, wherein the one or more polyether groups has a repeat unit according to (—CH$_2$CH$_2$O—), (—CH$_2$CH(CH$_3$)O—), or a combination thereof.

6. The composition of claim 1, wherein the one or more polyamine groups include a linear polyamine, a branched polyamine, or a dendritic polyamine.

7. The composition of claim 1, wherein the one or more polyamine groups have a repeat unit according to ((CH$_2$)$_y$NH), wherein y is from 2 to 6 inclusive.

8. The composition of claim 1, wherein the one or more polyamine groups comprise a radical represented by Structure 5c:

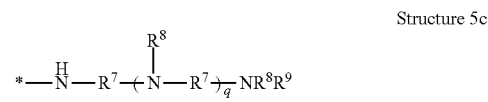

Structure 5c wherein
each $R^7$ is independently a $C_1$ to $C_{12}$ alkylene, optionally substituted with hydroxyl;
each $R^8$ or $R^9$ is independently hydrogen, $C_1$ to $C_{12}$ alkyl, (—R$^7$O—)$_x$H, a polyamine, or (—R$^7$—NR$^{11}$)$_q$R$^{12}$;
each $R^{11}$ or $R^{12}$ is independently hydrogen, $R^{10}$, or (—R$^7$O)$_x$H;
each $R^{10}$ is independently hydrogen, $C_1$ to $C_{12}$ alkyl, or a cation;
each x is independently 2 to 100; and
q is 0 to 12.

9. The composition of claim 1, wherein the polysaccharide derivative comprises a polysaccharide substituted with —CH$_2$OCH$_2$CH(OH)CH$_2$NH(CH$_2$)$_{2-6}$NH(CH$_2$CH(CH$_3$)O)$_{2-100}$H, and/or —CH$_2$OCH$_2$CH(OH)CH$_2$NH—R$^7$—(N(R$^8$)—R$^7$)$_{0-12}$—NH(CH$_2$CH$_2$O)$_{2-100}$H, wherein each $R^7$ is independently a $C_1$ to $C_{12}$ alkylene, optionally substituted with hydroxyl; each $R^8$ is independently hydrogen, $C_1$ to $C_{12}$ alkyl, (-R$^7$O-)$_x$H, a polyamine or (-R$^7$-NR$^{11}$)$_q$R$^{12}$; each $R^{11}$ or $R^{12}$ is independently hydrogen, $R^{10}$, or (-R$^7$O-)$_x$H; each $R^{10}$ is independently hydrogen, $C_1$ to $C_{12}$ alkyl, or a cation; each x is independently 2 to 100; and q is 0 to 12.

10. The composition of claim 1, wherein the at least one polyamine group is terminated with one or more polyether groups.

11. The composition of claim 1, wherein at least one polyether group has a degree of polymerization in the range of from 2 to 100.

12. The composition of claim 2, wherein the enzyme comprises at least one protease.

13. A method for treating a substrate comprising:
   i) providing a composition, wherein the composition comprises a polysaccharide derivative;
   ii) contacting the substrate with the composition; and
   iii) optionally rinsing the substrate;
   wherein the polysaccharide derivative comprises a polysaccharide substituted with:
      a) one or more polyamine groups;
      b) one or more polyether groups; or
      c) a combination of a) and b);
   wherein the polysaccharide is:
   A) a polysaccharide A comprising 25 to 35% alpha-1,3-glycosidic linkages, 55 to 75% alpha-1,6-glycosidic linkages and 5 to 15% alpha-1,3,6-glycosidic linkages, and having a weight average molecular weight of less than 5000 Daltons;

B) a polysaccharide B comprising 10 to 20% alpha-1,4-glycosidic linkages, 60 to 88% by weight alpha-1,6-glycosidic linkages, and 5 to 30% alpha-1,4,6- or alpha-1,2-6-glycosidic linkages, and having a weight average molecular weight of less than 5000 Daltons; and/or C) a polysaccharide C comprising 0 to 50% alpha-1,3-glycosidic linkages and/or 0 to 40% alpha-1,4-glycosidic linkages, 1 to 50% alpha-1,2-glycosidic linkages and alpha-1,2,6-glycosidic linkages, 0 to 25% alpha-1,3,6-glycosidic linkages and less than 99% alpha-1,6-glycosidic linkages, and having a weight average molecular weight of less than 300,000 Daltons.

14. The method of claim 13, wherein the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

15. The method of claim 13, wherein the composition is in the form of a liquid, a gel, a powder, a hydrocolloid, an aqueous solution, a granule, a tablet, a capsule, a single compartment sachet, or a multi-compartment sachet.

* * * * *